US010057021B2

(12) United States Patent
Tsai et al.

(10) Patent No.: US 10,057,021 B2
(45) Date of Patent: Aug. 21, 2018

(54) RESOURCE ALLOCATION IN A WIRELESS COMMUNICATION SYSTEM

(71) Applicant: Ubiquiti Networks, Inc., San Jose, CA (US)

(72) Inventors: Ching-Han Tsai, San Diego, CA (US); ChihWei Fanchiang, Taipei (TW); I-Feng Lin, Taoyuan (TW); Sheng-Feng Wang, Santa Clara, CA (US); Hua-Lin Hsu, New Taipei (TW)

(73) Assignee: Ubiquiti Networks, Inc., San Jose, CA (US)

( * ) Notice: Subject to any disclaimer, the term of this patent is extended or adjusted under 35 U.S.C. 154(b) by 102 days.

(21) Appl. No.: 15/131,563

(22) Filed: Apr. 18, 2016

(65) Prior Publication Data

US 2016/0315741 A1    Oct. 27, 2016

Related U.S. Application Data

(60) Provisional application No. 62/152,685, filed on Apr. 24, 2015.

(51) Int. Cl.
*H04L 5/00* (2006.01)
*H04W 72/12* (2009.01)

(52) U.S. Cl.
CPC .......... *H04L 5/0007* (2013.01); *H04L 5/0046* (2013.01); *H04W 72/1231* (2013.01)

(58) Field of Classification Search
CPC . H04L 5/0007; H04L 5/0046; H04W 72/1231
See application file for complete search history.

(56) References Cited

U.S. PATENT DOCUMENTS

| 8,400,937 B2 | 3/2013 | Huang et al. |
| 2004/0083385 A1 | 4/2004 | Ahmed et al. |
| 2008/0123520 A1 | 5/2008 | Ji et al. |
| 2012/0328055 A1 | 12/2012 | Yokote |

(Continued)

FOREIGN PATENT DOCUMENTS

KR    20090039578    4/2009

OTHER PUBLICATIONS

International Search Report and Written Opinion dated Aug. 4, 2016 for International Application No. PCT/US2016/28602 filed on Apr. 21, 2016 by Ubiquiti Networks, Inc., 10 pages.

*Primary Examiner* — Walter J Divito
(74) *Attorney, Agent, or Firm* — Silicon Valley Patent Group LLP

(57) ABSTRACT

Embodiments of methods and apparatuses for resource allocation in a wireless communication system are disclosed. In one embodiment, a method of wireless communication comprises obtaining data to be transmitted over a plurality of sub-channels in a wireless communication environment, determining channel conditions associated with the plurality of sub-channels, scheduling the data to be transmitted according to the channel conditions associated with the plurality of sub-channels to form scheduled data for transmission, and transmitting the scheduled data to one or more receivers via the plurality of sub-channels. The method of determining channel conditions associated with the plurality of sub-channels comprises determining interference observed at each sub-channel in the plurality of sub-channels.

14 Claims, 14 Drawing Sheets

(56) References Cited

U.S. PATENT DOCUMENTS

2014/0146924 A1    5/2014   Shattil
2015/0079945 A1    3/2015   Rubin et al.
2017/0085311 A1*   3/2017   Wang .................... H04L 1/0003

* cited by examiner

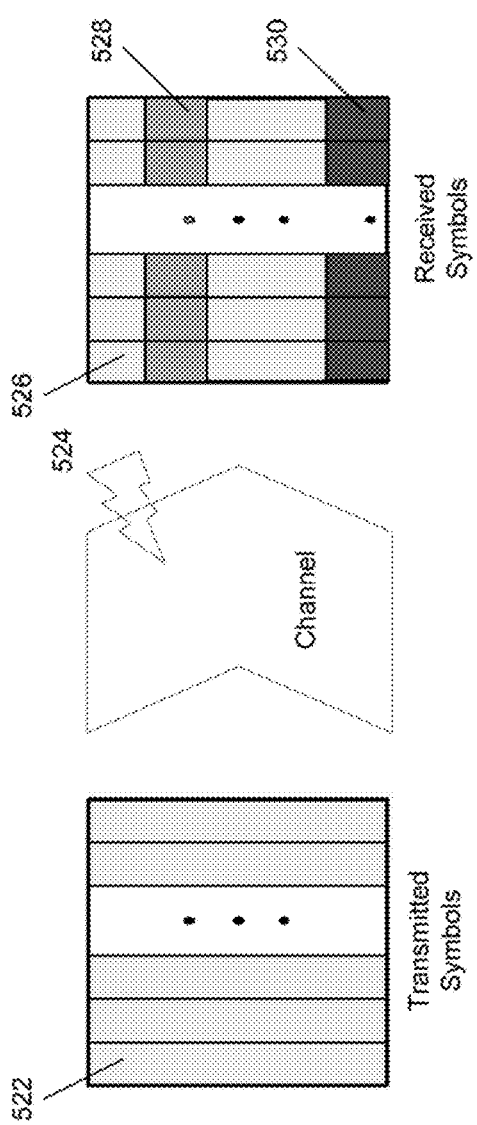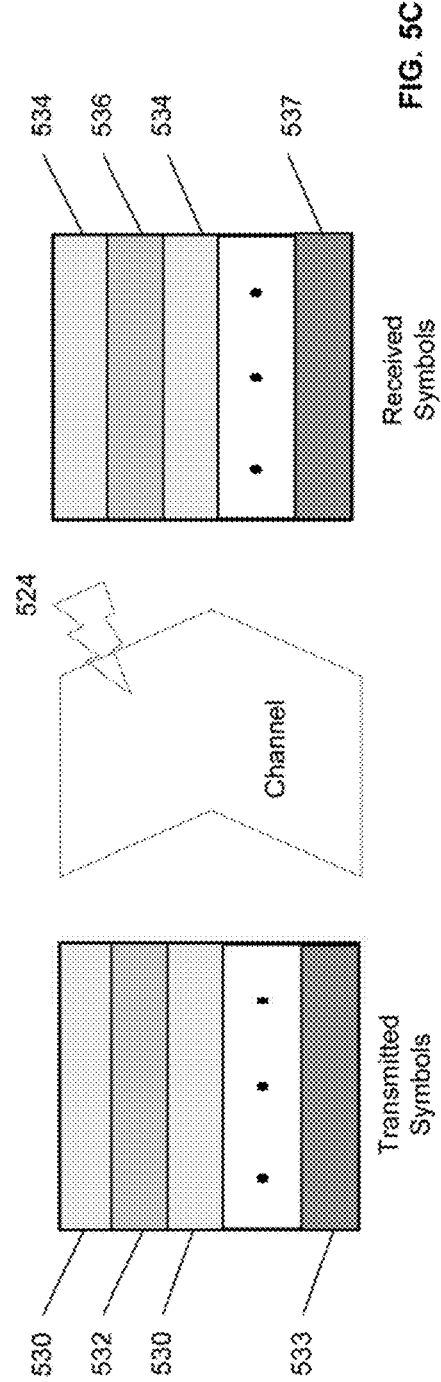

| Queue ID | Q1 | Q4 | Q6 | Q9 | Q5 | Q12 | Q2 | Q11 | Q3 | Q8 | Q10 | Q7 |
|---|---|---|---|---|---|---|---|---|---|---|---|---|
| Score | 49 | 45 | 42 | 38 | 28 | 22 | 17 | 15 | 8 | 2 | 0 | 0 |

← 662 Original sorted list before scheduling

| Queue ID | Q1 | Q4 | Q6 | Q9 | Q5 | Q12 | Q2 | Q11 | Q3 | Q8 | Q10 | Q7 |
|---|---|---|---|---|---|---|---|---|---|---|---|---|
| Score | 49 0 | 45 0 | 42 | 38 0 | 28 0 | 22 | 17 | 15 0 | 8 | 2 | 0 | 0 |

← 664 Queues 1, 4, 9, 5, 11 are scheduled; score cleared to 0

| Queue ID | Q1 | Q4 | Q6 | Q9 | Q5 | Q12 | Q2 | Q11 | Q3 | Q8 | Q10 | Q7 |
|---|---|---|---|---|---|---|---|---|---|---|---|---|
| Score | 0 | 0 | 42 48 | 0 | 0 | 22 24 | 17 25 | 0 | 8 12 | 2 5 | 0 6 | 0 3 |

← 666 Queues 6, 12, 2, 3, 8, 10, 7 are not scheduled; their scores are updated

| Queue ID | Q6 | Q12 | Q2 | Q3 | Q8 | Q10 | Q7 | Q1 | Q4 | Q9 | Q5 | Q11 |
|---|---|---|---|---|---|---|---|---|---|---|---|---|
| Score | 48 | 24 | 25 | 12 | 5 | 6 | 3 | 0 | 0 | 0 | 0 | 0 |

← 668 Scheduled queues with zero scores are moved to end of list, leaving the list "almost" sorted

| Queue ID | Q6 | Q2 | Q12 | Q3 | Q8 | Q10 | Q7 | Q1 | Q4 | Q9 | Q5 | Q11 |
|---|---|---|---|---|---|---|---|---|---|---|---|---|
| Score | 48 | 25 | 24 | 12 | 6 | 5 | 3 | 0 | 0 | 0 | 0 | 0 |

← 670 List is re-sorted based on updated scores; only highlighted queues are reordered

FIG. 6D

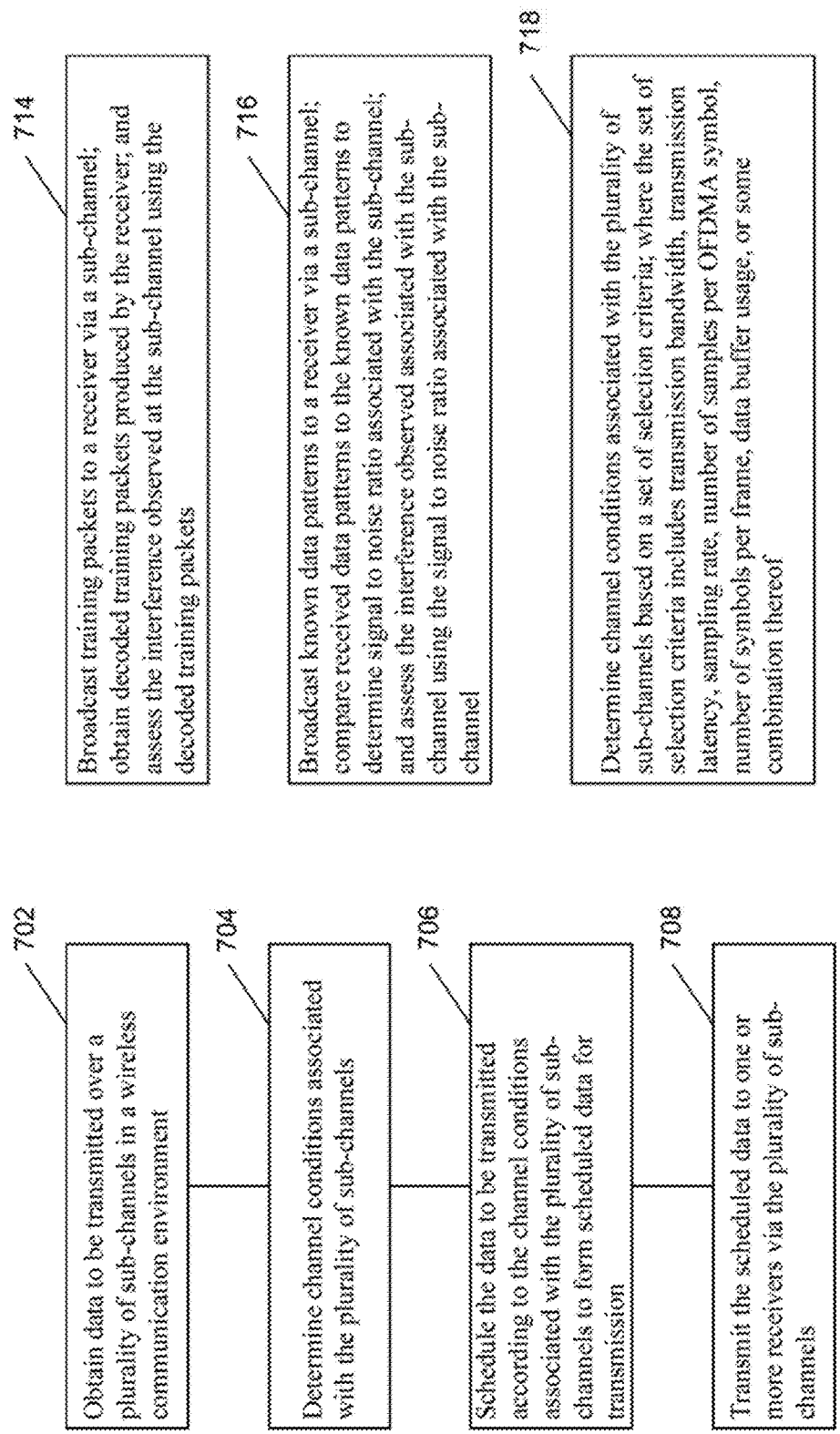

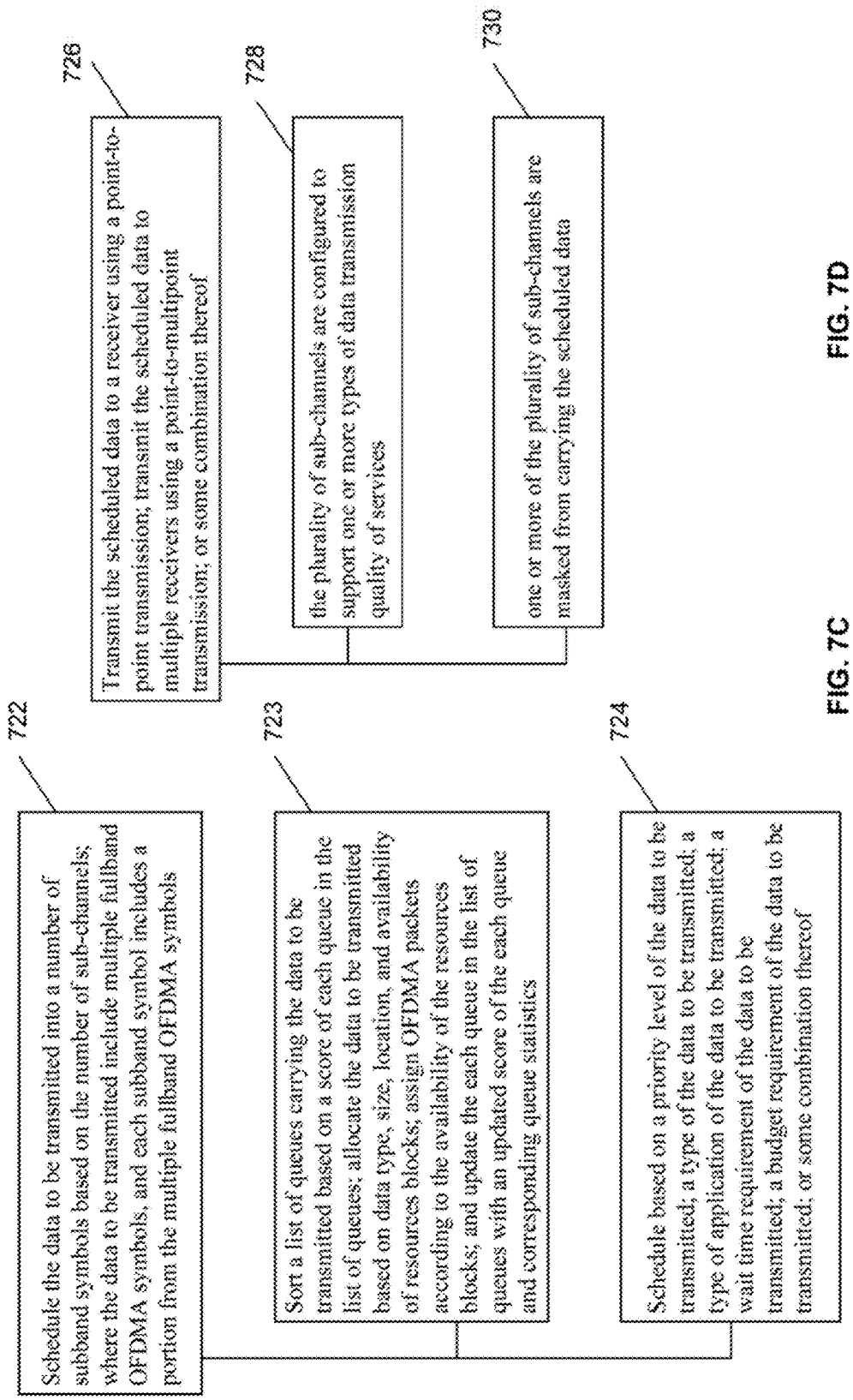

ial of sub-channels comprises determining interference observed at each sub-channel in the plurality of sub-channels.

RESOURCE ALLOCATION IN A WIRELESS COMMUNICATION SYSTEM

CROSS REFERENCE TO RELATED APPLICATION

This application claims the benefit of U.S. provisional patent application No. 62/152,685, "Resource Allocation in a Wireless Communication System," filed Apr. 24, 2015, which is assigned to the assignee hereof. The aforementioned United States patent application is hereby incorporated by reference in its entirety.

FIELD

The present disclosure relates to the field of wireless communications. In particular, the present disclosure relates to methods and apparatuses for resource allocation in an orthogonal frequency division multiple access (OFDMA) system and/or using the same.

BACKGROUND

In wireless communications, interferences in communication channels are often encountered. FIG. 3 illustrates effects of interference in a communication channel according to aspects of the present disclosure. As shown in the example of FIG. 3, in transmission of one or more full-band OFDM symbols 302, if there is narrow-band interference 304 in the communication channel, the received full-band OFDM symbols 306 can be affected or damaged with errors. The interference source may occupy a certain portion of the channel (for example 10% of the channel) as represented by the error band 308. Since the interference 304 may always be present and the OFDM transmission occupies the full-band, every OFDM symbol can be affected or damaged by the interference, and this adverse effect may exist in each received full-band OFDM symbol persistently. To overcome the problem of such narrow-band interferences, one approach is to reduce the modulation rate, and employ forward error correction (FEC) coding with higher redundancy. However, lower modulation rate may require lower signal-to-noise ratio (SNR), or require stronger FEC coding to allow correction of the transmission errors using the embedded error correction information. As a result, by using the lower modulation-coding scheme (MCS) and/or FEC coding with higher redundancy to overcome the interference, the overall system performance may be adversely impacted. To minimize the impact of such interferences, it is beneficial to use methods and apparatuses for resource allocation in an orthogonal frequency division multiple access (OFDMA) system and/or using the same.

SUMMARY

Embodiments of resource allocation in a wireless communication system and methods for using the same are disclosed. In one embodiment, a method of wireless communication comprises obtaining data to be transmitted over a plurality of sub-channels in a wireless communication environment, determining channel conditions associated with the plurality of sub-channels, scheduling the data to be transmitted according to the channel conditions associated with the plurality of sub-channels to form scheduled data for transmission, and transmitting the scheduled data to one or more receivers via the plurality of sub-channels. The method of determining channel conditions associated with the plu-

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the non-limiting and non-exhaustive aspects of following drawings. Like numbers are used throughout the figures.

FIG. 5B illustrates another example of effects of interference in a communication channel according to aspects of the present disclosure.

FIG. 5C illustrates a method of reducing errors in received symbols caused by interferences in the example of FIG. 5B according to aspects of the present disclosure.

FIG. 6D illustrates a method of modifying a sorted list according to aspects of the present disclosure.

FIG. 7A illustrates a method of wireless communication according to aspects of the present disclosure.

FIG. 7B illustrates methods of determining channel conditions associated with a plurality of sub-channels according to aspects of the present disclosure.

FIG. 7C illustrates methods of scheduling data to be transmitted according to channel conditions associated with a plurality of sub-channels according to aspects of the present disclosure.

FIG. 7D illustrates methods of transmitting scheduled data to one or more receivers via a plurality of sub-channels according to aspects of the present disclosure.

DESCRIPTION OF EMBODIMENTS

Embodiments of methods and apparatuses for resource allocation in an orthogonal frequency division multiple access (OFDMA) system are disclosed. The following descriptions are presented to enable any person skilled in the art to make and use the disclosure. Descriptions of specific embodiments and applications are provided only as examples. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
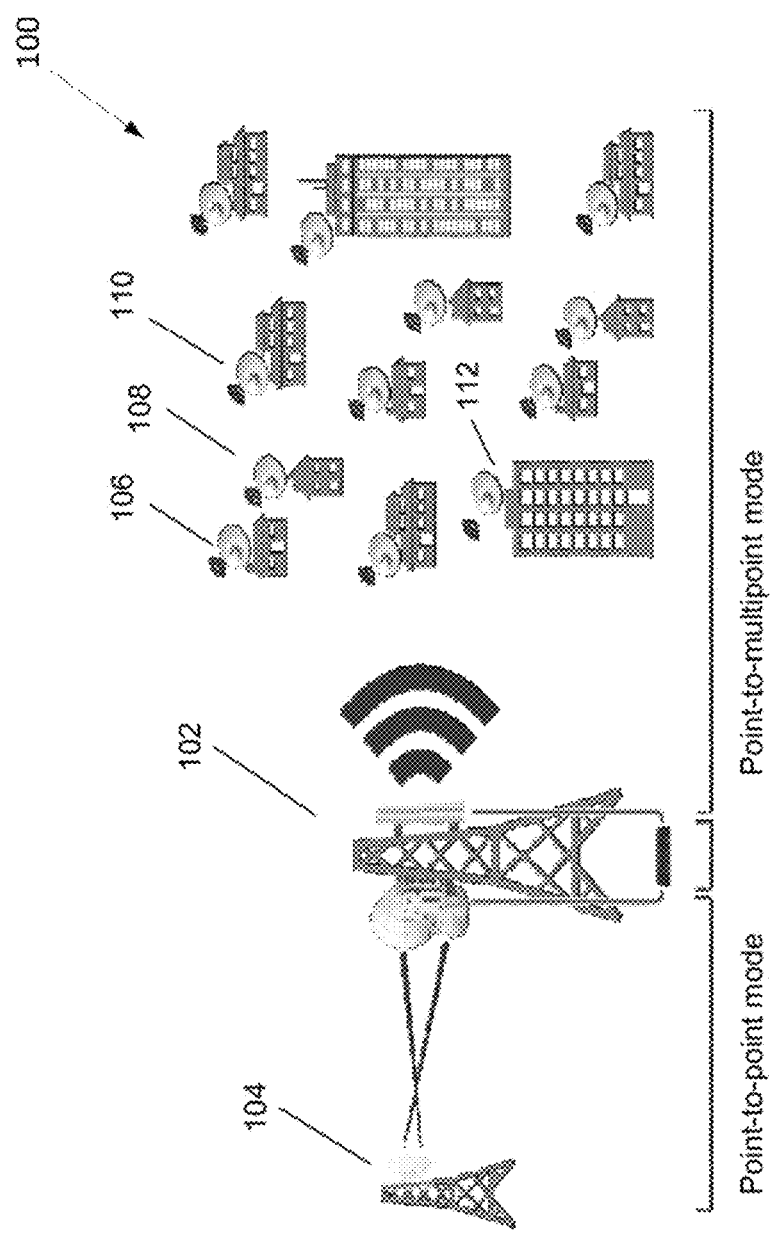
FIG. 1 illustrates an exemplary wireless environment for performing resource allocation according to aspects of the present disclosure.

FIG. 1 illustrates an exemplary wireless environment for performing resource allocation according to aspects of the present disclosure. As shown in FIG. 1, an apparatus 102 can be configured to communicate wirelessly with another apparatus 104 in a point-to-point manner. In some embodiments, the apparatus 102 may be employed as a fixed wireless broadband solution for Internet Service Providers. For example, the apparatus 102 can be configured to operate in a point-to-point mode to replace fiber optics. In addition, the apparatus 102 can also be configured to communicate wirelessly with a plurality of apparatuses, such as 106, 108, 110, and 112, in a point-to-multipoint manner. When operating in the point-to-multipoint mode, the apparatus 102 may be employed to replace cable modem or DSL as the last-mile access technology.

Figure 2:
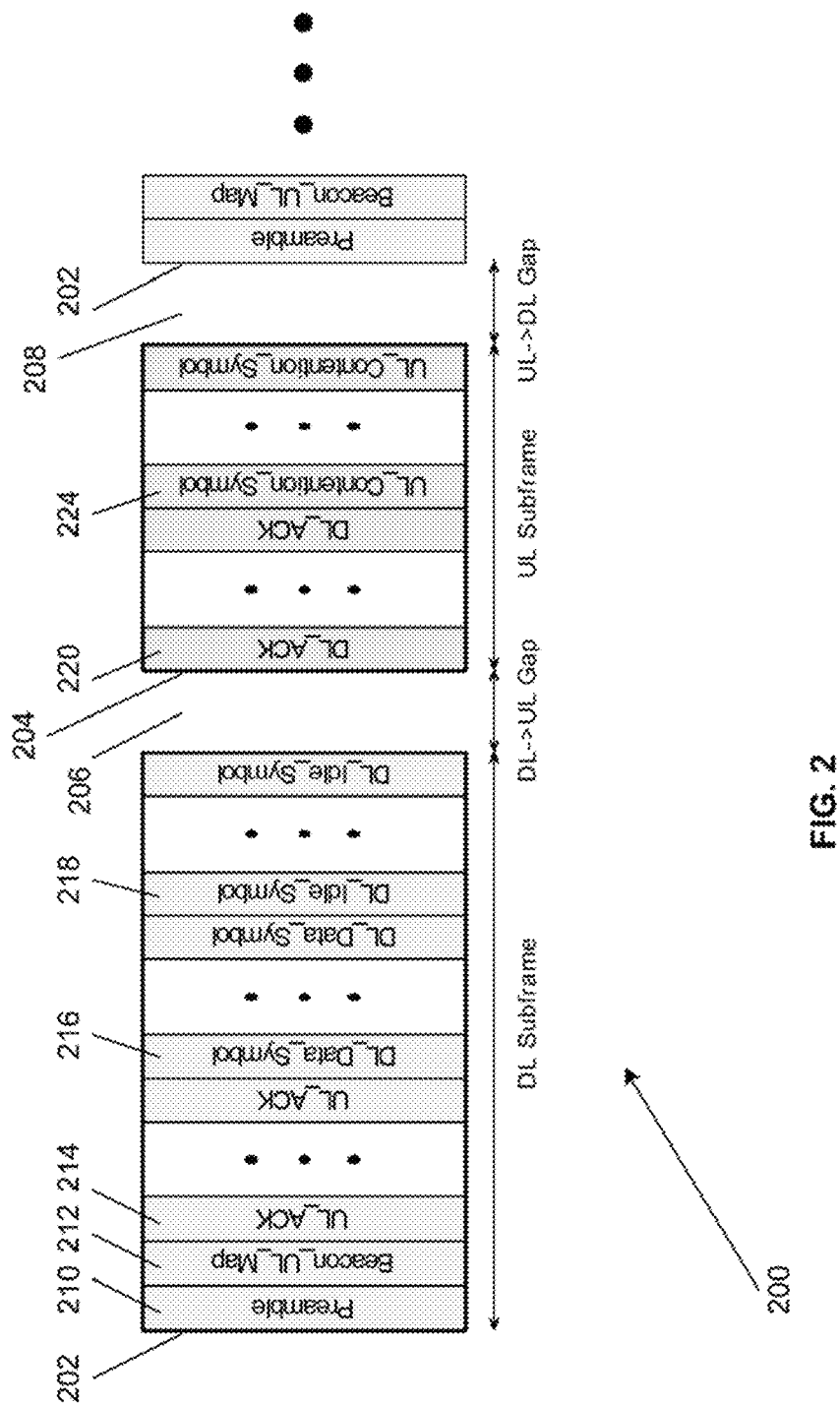
FIG. 2 illustrates an exemplary implementation of a time domain duplexing frame structure according to aspects of the present disclosure.

FIG. 2 illustrates an exemplary implementation of a time domain duplexing frame structure according to aspects of the present disclosure. In the exemplary implementation shown in FIG. 2, a time domain duplexing (TDD) frame structure 200 may include one or more downlink (DL) subframe 202, one or more uplink (UL) subframe 204, one or more DL->UL gap 206, and one or more UL->DL gap 208. In this particular implementation, a DL subframe 202 may include a Preamble 210, a Beacon_UL_map 212, one or more UL_ACKs 214, one or more DL_Data_Symbols 216, and one or more DL_Idle_Symbols 218. An UL subframe 204 may include one or more DL_ACKs 220 and one or more UL_Contention_Symbols 224.

According to aspects of the present disclosure, data transmitted wirelessly may be grouped into multiple OFDM symbols, where the multiple OFDM symbols may construct a subframe; and each subframe handles either data transmission or reception. One transmission subframe and one reception subframe construct a frame, which may typically be 2 milliseconds (ms) long. Since the transmission and reception may not happen concurrently, this approach may also be referred to as time-domain duplexing (TDD).

In some embodiments, each 2-ms frame can be partitioned into the DL and UL subframes. During the DL subframe, data can be transmitted from an access point (AP) to the client premise equipment (CPEs); during the UL subframe, the data transmission may occur in the reversed direction, from the CPEs to the AP. There may be two idle gaps for the DL-to-UL 204 and UL-to-DL 208 transition. The symbol counts of the DL and UL subframes, and the lengths of the idle gaps, can be configured as programmable parameters, based on the system bandwidth. The TDD frame structure is shown in FIG. 2.

As shown in FIG. 2, symbols can take on different purposes, such as preamble (for defining frame boundary), beacon (broadcasting system information), UL_map (UL scheduling decision), UL_ACK (acknowledgements) for prior transmissions, and regular data symbols. Data symbols within a frame may be destined to different CPEs, and data symbols within a UL frame originate from different CPEs, depending on the traffic pattern and scheduler decision. Regardless of the symbol type, each symbol may occupy the full bandwidth of the system channel; and regardless of the actual designated recipient, every symbol in a DL subframe can be heard by every CPE.

Table 1 summarizes implementations of bandwidths, the sampling rate, the number of samples per OFDM symbol (including the 2-us cyclic prefix), and the number of symbols per frame according to some embodiments of the present disclosure.

TABLE 1

| System BW | Sampling clock | Cyclic Prefix (2-us) | Samples/symbol | Symbols/frame |
|---|---|---|---|---|
| 100 MHz | 112 MHz | 224 samples | 736 | 304 |
| 90 MHz | 100.8 MHz | 202 samples | 714 | 282 |
| 80 MHz | 89.6 MHz | 180 samples | 692 | 258 |
| 70 MHz | 78.4 MHz | 157 samples | 669 | 234 |
| 60 MHz | 67.2 MHz | 135 samples | 647 | 207 |
| 50 MHz | 56 MHz | 112 samples | 624 | 179 |
| 40 MHz | 44.8 MHz | 90 samples | 602 | 148 |
| 30 MHz | 33.6 MHz | 68 samples | 580 | 115 |
| 20 MHz | 22.4 MHz | 45 samples | 557 | 80 |
| 10 MHz | 11.2 MHz | 23 samples | 535 | 41 |

According to aspects of the present disclosure, for a CPE to be associated with an AP, the CPE can be configured to receive and decode QPSK-modulated data transmitted across the full-band by the AP. As a result, the beacon, UL_Map, and broadcast packets can still be transmitted in a non-OFDMA way (in low modulation rate) across the full-band. Based on the interferences observed by each CPE, the corresponding data transmission may take up a portion of the system bandwidth.

Figure 4A:
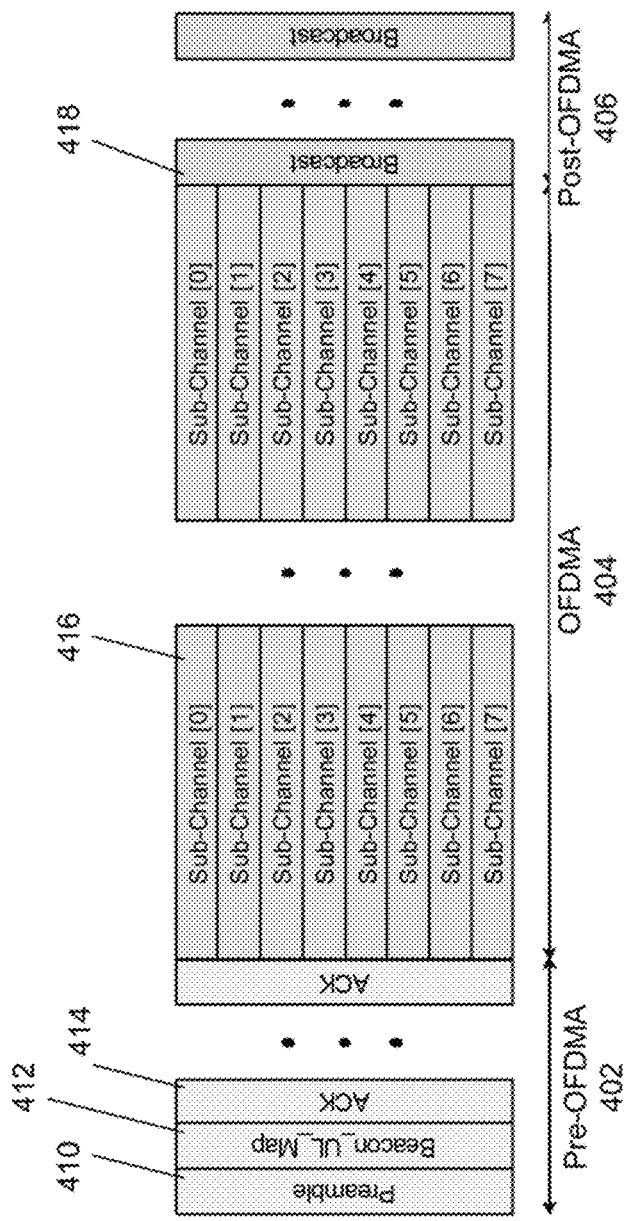
FIG. 4A illustrates an exemplary implementation of an orthogonal frequency domain multiple accesses mode downlink frame structure according to aspects of the present disclosure.

FIG. 4A illustrates an exemplary implementation of an orthogonal frequency domain multiple accesses mode downlink frame structure according to aspects of the present disclosure. In the example shown in FIG. 4A, each DL frame can be partitioned into three sections, namely the pre-OFDMA section 402, the OFDMA section 404, and the post-OFDMA section 406. The pre-OFDMA section 404 may include a preamble 410, beacon and UL_map 412, one or more ACKs 414, and other data (not shown) that are transmitted across the full-band. Note that the one or more ACKs 414 and other data may be optional. The OFDMA section 404 may be organized into one or more slots; within each slot, the system band can be scheduled into multiple sub-channels 416 of equal bandwidth. For example, in some embodiments, 2, 4, or 8 sub-channels can be supported. The length of each slot can be equal to 2, 4, or 8 OFDM symbols respectively, same as the number of sub-channels. In this manner, the sub-channels within each slot, such as sub-channel [0] through sub-channel [7] in the example shown in FIG. 4A can carry the same amount of information as one (full-band) OFDM symbol. The post-OFDMA section 406 may include other data transmitted across the full-band. Broadcast data 418 or data destined for CPEs without local sub-band interference, may continue to use the full system band. Note that an OFDMA portion can be disabled for latency or other purposes. For example, an OFDMA portion can be disabled when limited narrow band interferences are observed.

Figure 5A:
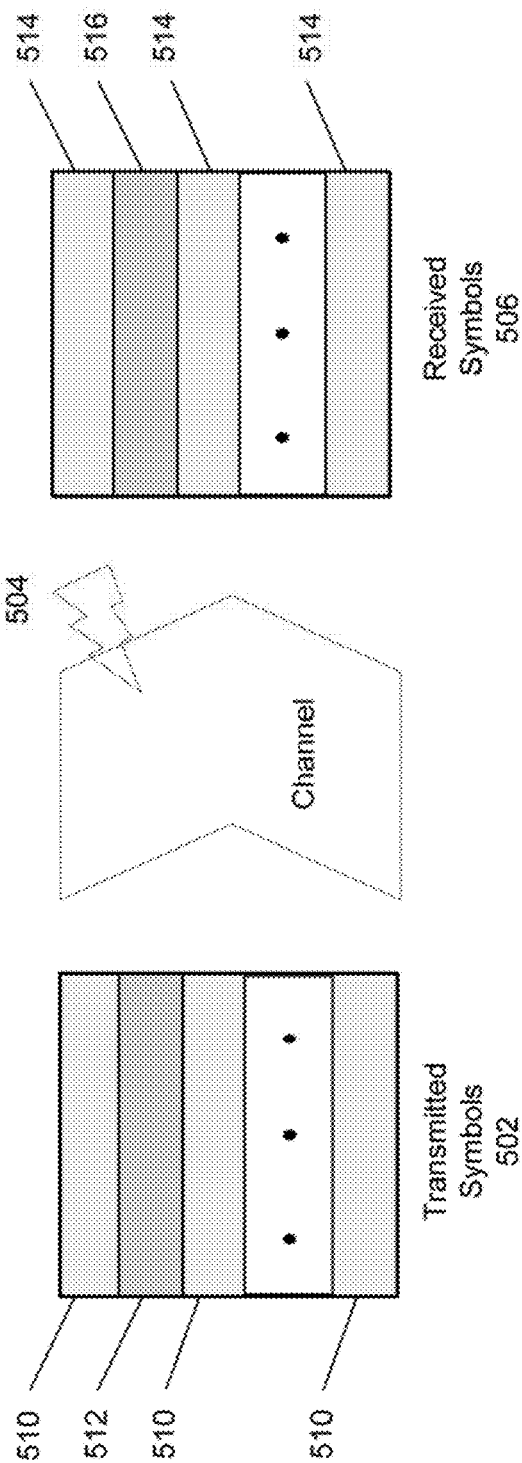
FIG. 5A illustrates a method of reducing errors in received symbols caused by interference in a communication channel according to aspects of the present disclosure.

FIG. 5A illustrates a method of reducing errors in received symbols caused by interference in a communication channel according to aspects of the present disclosure. As shown in FIG. 5A, the transmitted symbols 502 may include one or more sub-band symbols 510 and one or more silent symbols 512. The one or more silent symbols 512 may be affected by narrow-band interference 504 during transmission. The received symbols 506 may include one or more received sub-band symbols 514 and one or more received silent symbols 516. The example shown in FIG. 5A can be employed to reduce the effect of narrow-band interference. The OFDMA frame structure can be configured to transmit at higher rates over sub-bands with reduced interference with the exemplary OFDMA procedure described below. For the sub-bands with interference, the OFDMA frame may either be transmitted at a lower MCS, or may not be transmitted over these sub-bands at all, leaving them available for use by other CPEs with no local interference over these sub-bands.

Figure 3:
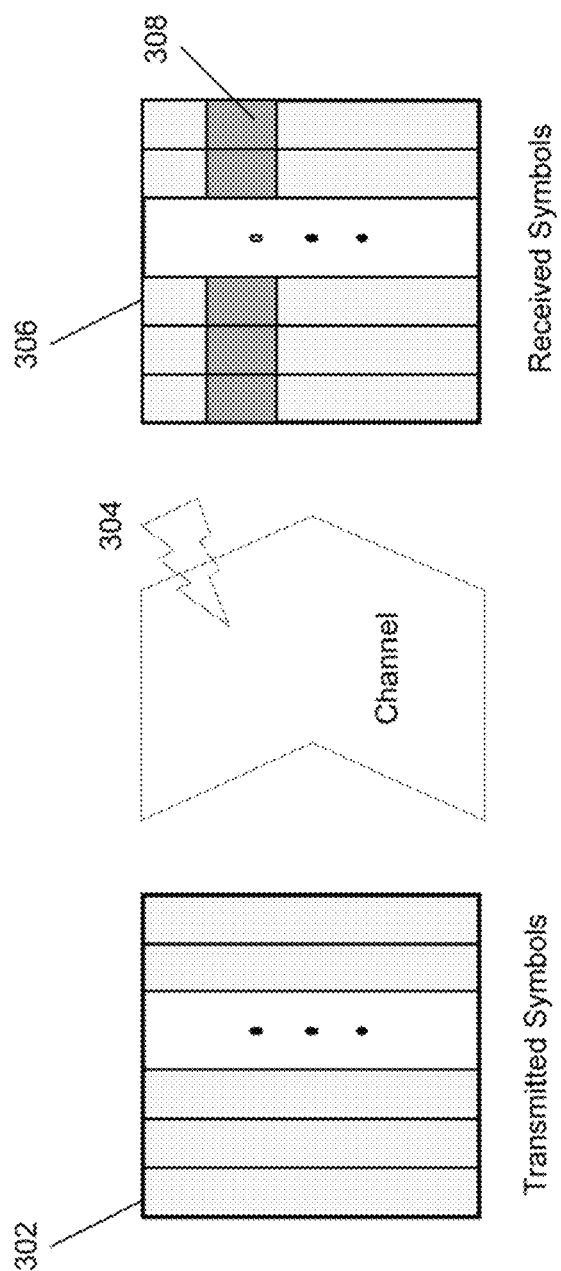
FIG. 3 illustrates effects of interference in a communication channel according to aspects of the present disclosure.

FIG. 5B illustrates another example of effects of interference in a communication channel according to aspects of the present disclosure. Similar to the example shown in FIG. 3, in transmission of one or more full-band OFDM symbols 522, if there are narrow-band interferences 524 in the communication channel, the received full-band OFDM symbols 526 can be affected or damaged with errors. The interference source may occupy a certain portion of the channel (for example 20% of the channel) as represented by the error bands 528 and 530. The received symbols in each error band may suffer different error rates as indicated by the error bands 528 and 530. In some situations, different number of error bands in different locations may be observed. Since the interferences 524 may always be present and the OFDM transmission occupies the full-band, every OFDM symbol can be affected by the interferences 524, and this adverse effect may exist in each received full-band OFDM symbol persistently.

FIG. 5C illustrates a method of reducing errors in received symbols caused by interferences in the example of FIG. 5B according to aspects of the present disclosure. In the example shown in FIG. 5C, the transmitted symbols may include one or more sub-band symbols 530 and one or more silent symbols, such as symbols 532 and 533. The one or more silent symbols may be affected by narrow-band interferences 524 during transmission. The received symbols may include one or more received sub-band symbols 534 and one or more received silent symbols 536 and 537. In this approach, the transmission error due to interferences would be controlled to affect certain silent symbols, such as symbols 532 and 533 to be transmitted, and symbols 536 and 537 to be received. As a result, each sub-band symbol may be controlled to ensure certain level of quality of service based on, but not limited to: 1) priority level, 2) types of traffic, 3) types of application; 4) wait time requirement, and 5) budget requirement as described below in Table 2.

According to aspects of the present disclosure, an exemplary OFDMA procedure may be implemented as follows. First, after registration, AP and CPE may work together to determine the conditions of all sub-channels while transmitting data across the full-band. Details of the sub-channel condition assessment are further described below.

Then, AP software may be configured to determine an optimal transmission mode (full-band vs. OFDMA) for each CPE based on the sub-channel conditions collected above. In some embodiments, certain CPEs may have one or more sub-channels masked out due to strong local interference; other CPEs may have relatively interference-free radio environments and may have access to all sub-channels.

Next, depending on the ratio between CPEs preferring full-band mode vs. CPEs preferring OFDMA mode (with strong sub-channel interference), the AP may be configured to decide the number slots to allocate for OFDMA section within a DL frame. The OFDMA section length may be adjusted dynamically. In that case, the AP may announce the starting location and length of the OFDMA section via the beacon in each frame.

Thereafter, the AP scheduler may be configured to schedule DL data transmission, subject to the restriction that some sub-channels may not be available to certain CPEs, due to the presence of interface in the corresponding sub-channels.

Last but not least, on the CPE side, the DL receiver may be configured to decode the received OFDM symbols, using the OFDMA section location/size information in the beacon for guidance. For the pre-OFDMA section and the post-OFDMA section, the receiver may perform decoding as soon as an OFDM symbol is received. For the OFDMA section, CPE DL receiver can be configured to accumulate data on the sub-channels until the end of a slot is reached, before it starts the decoding process.

According to aspects of the present disclosure, there are a number of ways in which AP and CPE may work together to determine the sub-channel conditions. For example, CPEs can calculate the signal-to-noise ratios (SNRs) within each sub-channel using the received preambles and pilots. Then, the CPEs can report the SNRs back to AP for reference. The AP can use the sub-channel SNRs to derive an optimal MCS for all CPEs/sub-channel combinations, or mask out some sub-channels for some CPEs if the SNRs fall below certain threshold levels. For another example, AP may transmit training packets (or sounding signals) periodically over both the full-band and all sub-channels using different MCS combinations. CPEs attempt to decode these training packets, collect the packet error rates, and report back to the AP via a higher-layer protocol. Thereafter, AP can be configured to collect sufficient information to determine the sub-channel conditions for all CPEs as well as the associated optimal MCS level.

Figure 6A:
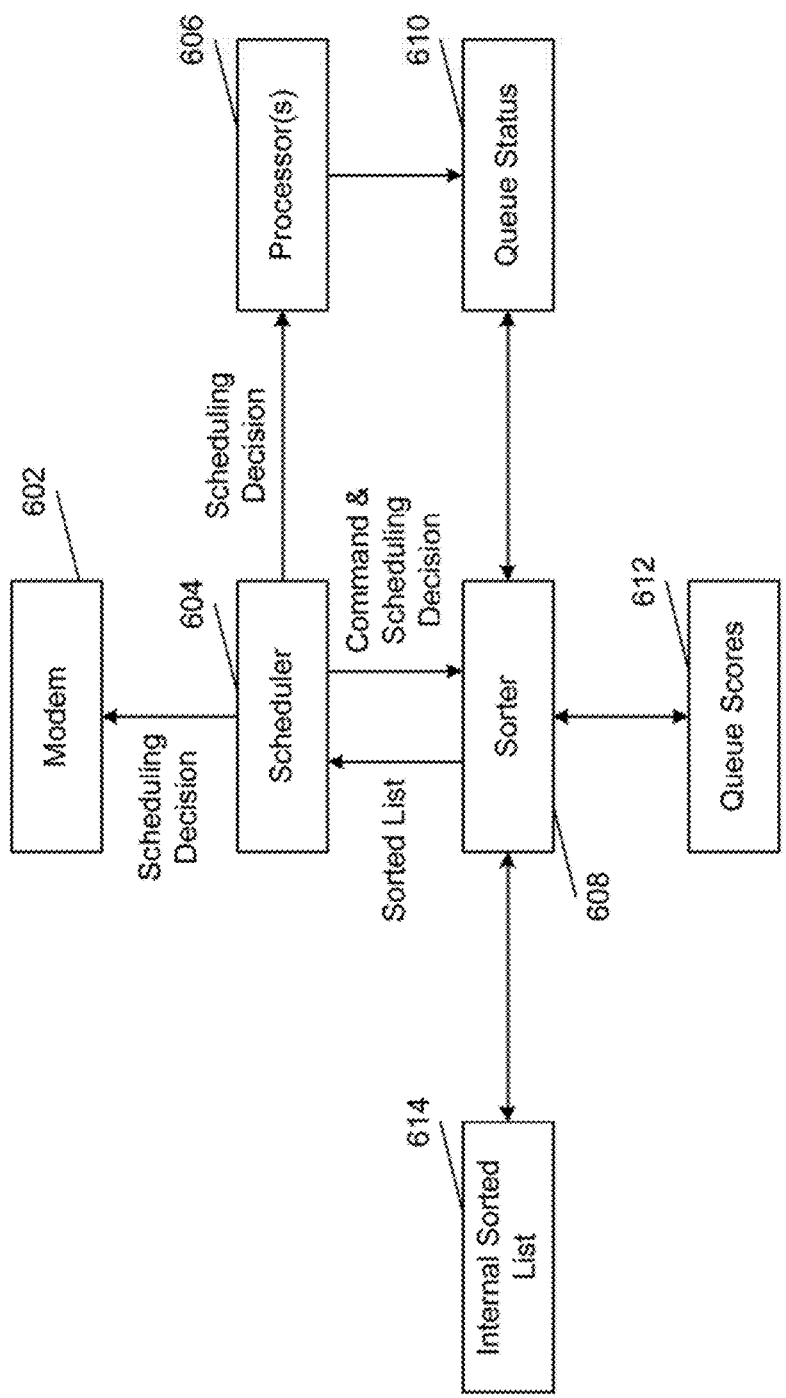
FIG. 6A illustrates an exemplary block diagram of components configured to perform the function of scheduling OFDMA frames according to aspects of the present disclosure.

FIG. 6A illustrates an exemplary block diagram of components configured to perform the function of scheduling OFDMA frames according to aspects of the present disclosure. As shown in FIG. 6A, the components employed for scheduling OFDMA frames may include a modem 602, a scheduler 604, one or more processor(s) 606, a sorter 608, a queue status handler 610, a queue score handler 612, and an internal sorted list handler 614. The modem 602, the scheduler 604, the one or more processors 606, the sorter 608, the queue status handler 610, the queue score handler 612, and the internal sorted list handler 614 may be functionally coupled to each other and functionally communicate with each other in the manner shown in FIG. 6A and described below.

For scheduling, the disclosed method first considers how the outgoing data can be organized on the AP. According to aspects of the present disclosure, to enable multiple stations to gain access to the shared radio resources, there are two types of radio systems: actively scheduled, or randomly accessed: in a random-access based system, each station first monitors the channel continuously, waits a random amount of delay after the channel becomes quiet, before it attempts transmission. If multiple stations attempt to start transmission at the same time, signals can be garbled, and transmissions may be attempted again at a later time. Successful transmissions can be acknowledged immediately; in other words, collisions are detected by timeout waiting for the ACKs. WiFi (802.11x) is an example of the most common random access based wireless system.

For some applications (for example outdoor, fixed, long-distance wireless links), random access based systems suffer from the hidden node issue: for example two CPEs may both be within range of the same AP, but they are too far to sense the signals from each other. As a result, the "listen-before-talk" principle cannot be guaranteed, and frequent collisions might happen on at the AP due to concurrent transmissions from both CPEs. As a result, the exemplary PTMP systems can be actively scheduled as described herein.

In some embodiments, traffic in the exemplary system may be organized into queues:

Each CPE has up to 8 data queues and one control queue locally. Incoming data via Ethernet is inspected and forwarded into one of the 8 data queues based on the quality-of-service (QoS) requirement. The control queue is used to store control information from the CPE to AP, such as radio channel quality, status of each data queue, pending acknowledgement of previously received transmission, etc.

The AP may reserve up to 8 data queues and one control queue for each CPE within the system, plus some special queues such as beacon, broadcast, etc.

Scheduling decisions can then be made with respect to queues; data can be fetched from the corresponding queue and transmitted out based on the scheduler output. In an exemplary PTMP system, scheduling decisions can be made by the AP for both DL and UL directions.

For DL scheduling, information used by the scheduler, such as transmit queue fullness, bandwidth budget, wait time since previous transmission, etc., can be made available on the AP. AP can make scheduling decision at the beginning of every subframe. The decision is not broadcasted to the CPEs; instead, AP may transmit data accordingly. Each data symbol may include a header with the ID of the intended recipient. All CPEs continuously decode all symbols in a DL subframe and check the symbol header to determine if a particular symbol should be received and processed; symbols intended for other CPEs may be discarded.

For UL scheduling, UL channel can be shared by all CPEs. As a result, UL scheduling should be performed in a centralized manner by AP, by considering the bandwidth requirements and allocation histories of all CPEs. However, the real-time queue status is available on the CPEs—that is, AP may not be aware when data comes into a queue on the CPE side unless the CPE somehow notifies the AP of the updated queue status. In an exemplary PTMP system, CPEs sends AP requests with updated queue status when there is data waiting to be transmitted. AP keeps a copy of the queue status from all CPEs, and uses this queue status to perform scheduling before each frame. The scheduling decision is described in the UL_map and transmitted out along with beacon at the start of every DL subframe. Each CPE decodes the UL_map to check whether it is scheduled for transmission during the upcoming UL subframe; if so, then it transmits data at the correct UL symbols as designated by the UL_map.

Note that all transmissions can be acknowledged explicitly in the immediate following subframe: for the DL direction, each CPE may send back acknowledgement in the following UL frame; for the UL direction, AP may send back acknowledgement in the next DL subframe to each CPE that is scheduled for transmission in the current UL subframe. Both AP and CPEs use the acknowledgments to update the queue status at the end of each frame, and the scheduling procedure as described above continues in the next frame.

According to aspects of the present disclosure, each AP can be wirelessly connected to multiple CPEs, providing each CPE with multiple levels of quality of services (QoS). The AP may then organize the outgoing data into multiple queues, such that each queue represents a unique CPE/QoS combination. The QoS can be based on considerations such as minimum response time and guaranteed throughput. AP may also designate one queue per CPE for storing special traffic such as control or acknowledgements. These special queues are typically assigned higher priority than the regular data queues. A small number of queues may be reserved for special traffic destined for all CPEs, such as beacon and broadcast/multicast. Table 2 summarizes some exemplary implementations of traffic classes according to aspects of the present disclosure.

TABLE 2

| Priority | Traffic Types | Application | Max Latency | Min Data Rate |
|---|---|---|---|---|
| 7 | Network Control | Router message | | |
| 6 | Internetwork Control | | | |
| 5 | Voice <10 ms <10 ms | VoIP, Video phone | 10 ms | Skype: 30/30 Kbps Video call: 300/300 Kbps |
| 4 | Video <100 ms | Streaming | 100 ms | 480P: 750-1000 Kbps 720P: 1500-3000 Kbps 1080P: 3000-5000 Kbps Music: 160-320 Kbps Netflix: 1.5-5 Mbps |
| 3 | Critical Application | On-line game | 5 ms~150 ms | PS4: 300/200 Kbps Xbox: 1000/200 Kbps |
| 2 | Excellent Effort | Web browsing | 500 ms | |
| 1 | Best Effort | Default traffic | | |
| 0 | Background | FTP | | |

The basic unit of scheduling in a frame can be either an OFDM symbol (in the full-band mode) or one sub-channel within a slot's time, which is also referred to as a resource block, or RB. The size of an RB may be the same regardless of whether it belongs to the OFDM or OFDMA section of the frame.

In some implementations, for each queue, the AP can be configured to maintain the following statistics:

Queue length—the amount of data waiting to be transmitted;

Queue QoS priority—from 0~7, corresponding to the QoS level in the table above; higher value means higher priority;

Wait_now—the amount of time since the queue has been previously scheduled;

Wait_max—the maximum allowable wait time before a queue has to be schedule. This is related to the latency requirement of a queue: the shorter the latency, the smaller the wait_max value;

Rate_now—the current data rate of the queue;

Rate_min—the required minimum data rate of the queue;

Rate_allowed—the maximum number of packets that the queue is allowed to transmit in this frame (if it is scheduled).

In some implementations, for each CPE, AP may maintain the following statistics about its capability:

Highest modulation rate for every sub-band and for the full band, based on the reported channel conditions.

In some implementations, for the exemplary point to multiple point system, the following parameters are determined a priori:

System bandwidth and frame structure: this in turn indicates how many RBs (both full-band and OFDMA) are available for scheduling per DL subframe;

Maximum number of queues to be scheduled per subframe: each scheduled queue requires explicit acknowledgement in the following UL frame. As a result, the maximum number of queues to be schedule may be limited to within a DL subframe, to keep the overhead incurred by ACKs in the next UL frame at a reasonable rate.

According to aspects of the present disclosure, the scheduling process may include the sorting, allocation, assignment, and updating steps.

In the sorting step, using the queue statistics described above, AP calculates and assigns a score to each queue, such that the higher the score is, the higher the scheduling priority. The score can be updated once every frame for every queue in the update step. This score is used during the sorting phase by the scheduler to construct a sorted list of queues with data (i.e. with non-zero queue lengths) based on the methods to be described below. The score of each queue is determined based on the following equation:

$$\text{score}(i) = \text{alpha} * (\text{wait\_now}/\text{wait\_max}) + \text{beta} * (1 - \text{rate\_now}/\text{rate\_min})$$

where alpha and beta are programmable parameters.

An exemplary implementation of the sorting method is provided as follows:

queues with higher scores are placed ahead of those with lower scores;

for queues with the same score, those with higher QoS levels are placed ahead of those with lower QoS levels;

for queues with the same score and same QoS level, those with longer queue lengths are placed ahead of those with shorter lengths.

Note that the actual sorting is done during the updating step; in the sorting step, the output sorted list is generated by pruning queues with zero length (i.e. with no data to transmit) from an internal sorted list Implementation details of the sorter are further described in the updating step.

In the allocation phase, the scheduler decides the size and location of the OFDMA section, by considering non-data type of traffic first. These non-data type of traffic include the beacon, ACKs, control messages (stored in the control queues), and broadcast. Each packet of special traffic types occupies one OFDM symbol. These special packets (also referred to as pre-OFDMA or post-OFDMA packets) have higher priorities than regular data packets; as a result, scheduler may try to schedule them first. The OFDMA section size can be determined by the following equation:

$$\text{OFDMA slot count} = (\text{frame symbol count} - \text{special packet count})/(\text{number of OFDMA sub-bands})$$

For example, if a frame has 90 symbols, and there are 8 special packets waiting to be transmitted, and there are 8 OFDMA sub-bands, then the OFDMA slot count=(90−8)/8=10. When (frame symbol count−special packet count) is not integer multiples of the OFDMA sub-band count, then there'll be left-over symbols. These symbols may be placed in the post-OFDMA section for scheduling in the OFDM fashion.

Figure 4B:
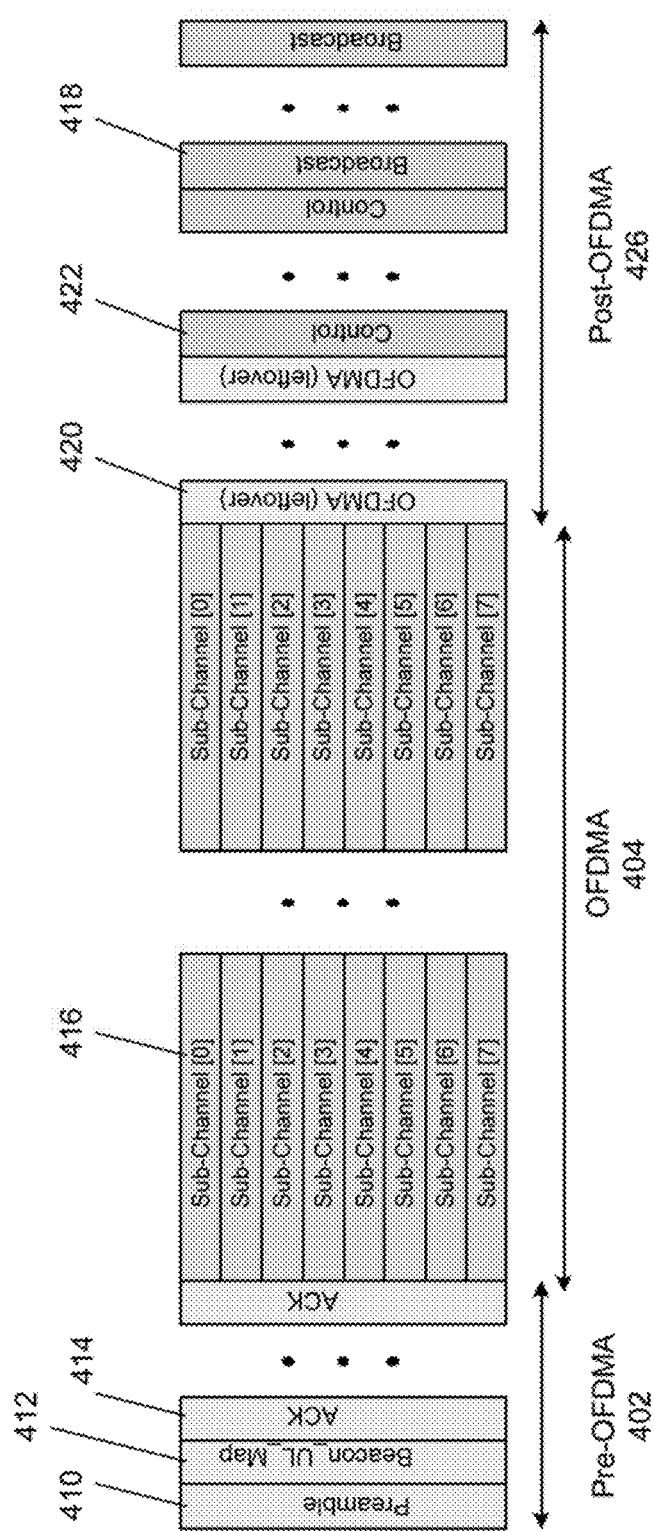
FIG. 4B illustrates a method of symbol allocation according to aspects of the present disclosure.

FIG. 4B illustrates a method of symbol allocation according to aspects of the present disclosure. As shown in FIG. 4B, it differs from FIG. 4A with the additional control messages 422 and left-over OFDM symbols 420 in the modified post-OFDMA section 426.

In some embodiments, during the assignment stage, the AP takes the first queue from the list, looks up the corresponding sub-channel conditions, and starts from the RB that is not yet taken but provides the highest MCS (or data rate) for this CPE. The AP scheduler may then assign this RB to this sub-channel, update the queue status and budget, and moves to the next RB/queue. The assignment stage stops when the entire allocation list has been consumed or when the symbol is fully scheduled (i.e. all the RBs are taken).

Note that in some cases a particular queue may include more data than it is given budget for transmission. When this happens, the scheduler may continue to (tentatively) assign some RBs to this queue, so long as there is RB or data available, allowing the budget to be temporarily exceeded, but it can mark the assignment result as "tentative". Subsequent queues with lower priorities may be allowed to overtake (or preempt) this tentative assignment as long as their budgets are not exceeded.

Figure 6B:
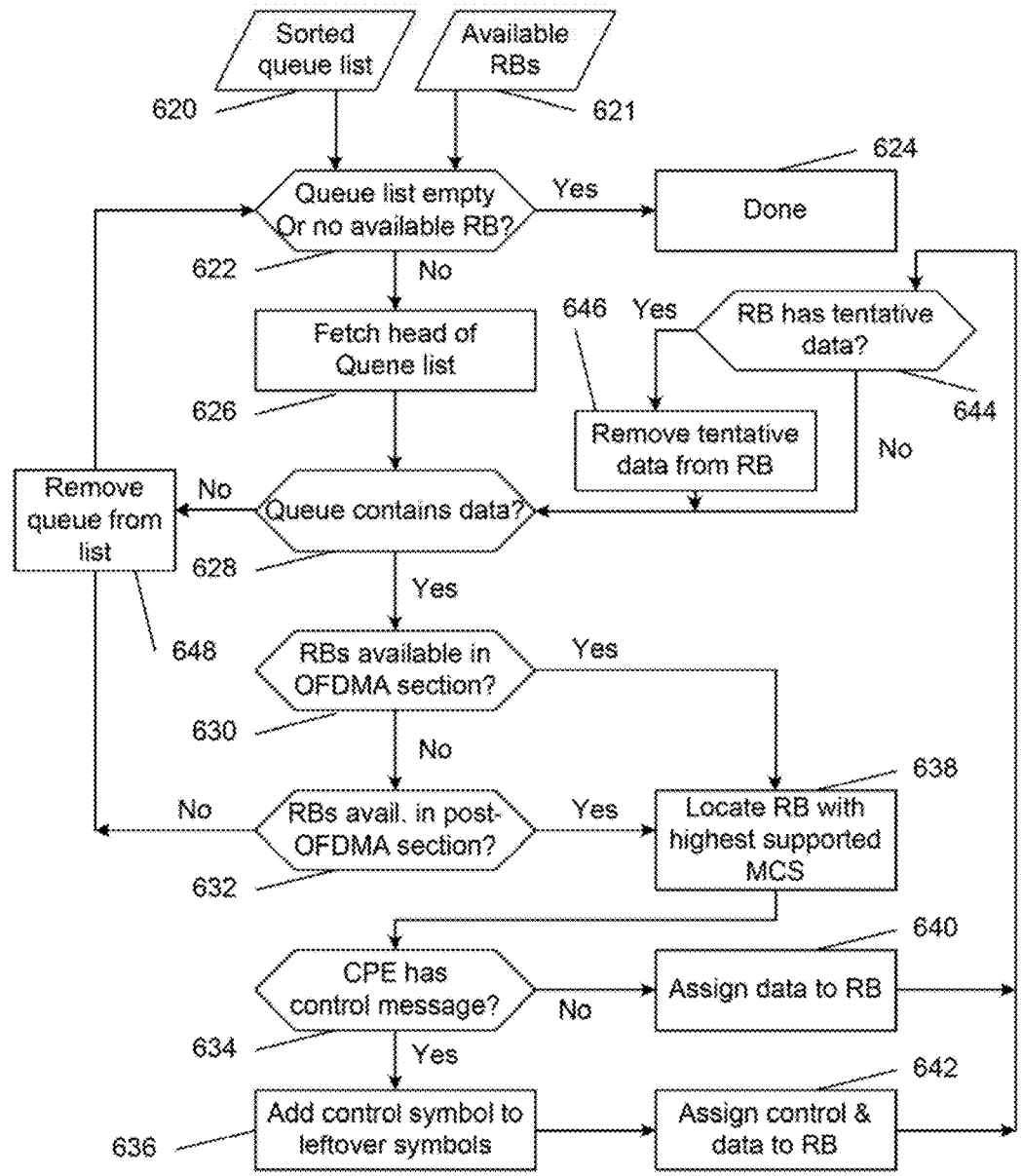
FIG. 6B illustrates a method of performing assignment according to aspects of the present disclosure.

FIG. 6B illustrates a method of performing assignment according to aspects of the present disclosure. In the exemplary implementation shown in FIG. 6B, information about sorted queue list 620 and available RBs 621 are provided to block 622, where an inquiry is made on whether the queue list is empty or there is no available RB. If the queue list is empty or there is no available RB (622_Yes), the method moves to block 624. In block 624, the method of performing assignment is done. Alternatively, if the queue list is not empty or there is available RB (622_No), the method moves to block 626. In block 626, the method fetches head of the sorted queue list, and then moves to block 628.

In block 628, another inquiry is made on whether the queue contains data. If the queue contains data (628_Yes), the method moves to block 630. Alternatively, if the queue does not contain data (628_No), the method moves to block 648. In block 630, yet another inquiry is made on whether there are RBs available in OFDMA section. If there are RBs available in OFDMA section (630_Yes), the method moves to block 638. Alternatively, if there are no RBs available in OFDMA section (630_No), the method moves to block 632.

In block 632, yet another inquiry is made on whether there are RBs available in post-OFDMA section. If there are RBs available in post-OFDMA section (632_Yes), the method moves to block 638. Alternatively, if there are no RBs available in post-OFDMA section (632_No), the method moves to block 648. In block 634, yet another inquiry is made on whether the CPE has a control message. If the CPE has a control message (634_Yes), the method moves to block 636. Alternatively, if the CPE does not have a control message (634_No), the method moves to block 640.

In block 636, the method adds the control symbol to leftover symbols, and then moves to block 642. In block 638, the method locates RB with highest supported MCS, and then moves to block 634. In block 640, the method assigns data to RB, and then moves to block 644. In block 642, the method assigns control messages and data to RB, and them moves to block 644.

In block 644, yet another inquiry is made on whether the RB has tentative data. If the RB has tentative data (644_Yes), the method moves to block 646. Alternatively, if the RB does not have tentative data (644_No), the method moves to block 628. In block 646, the method removes tentative data from RB, and then moves to block 628. In block 648, the method removes queue from list, and then moves to block 622.

According to aspects of the present disclosure, in the assignment phase, scheduler assigns special packets including preamble, beacon, ACKs, and broadcast packets to their corresponding symbols based on the FIG. 6B (given that their scheduling priority is higher). Control packets are not assigned yet (although symbols are tentatively allocated for them)—if there are data packets to be transmitted to the same CPE, then the control packets can be merged with data packets in the same symbol and save space.

Recall that for each CPE, different sub-channels may have different capacities (or maximum supported MCS rates) due to different interference levels. The OFDMA assignment works as follows:

Take the queue from the head of the sorted list (block 626);
Find the next available RBs with the highest supported modulation coding scheme (block 638);
Fill the RBs with control packets for the same CPE (if present) (block 642), then data packets from the queue (blocks 642 and 640), until either the queue has no more packets, or there is no more RBs available;
Remove the queue from the sorted list (block 648).

In some embodiments, available RBs include those in the OFDMA section as well as the leftover OFDM symbols in the post-OFDMA section. OFDMA RBs are considered for assignment first (block 630) before left-over OFDM symbols (block 632).

If the queue belongs to a CPE that also has control packets waiting to be transmitted, the control packets are merged with the data packets in the same RB, and the pre-allocated OFDM symbol for these control packets are added to the leftover OFDM symbols instead (block 642).

In some implementations, queue_length may be greater than rate_allowed. Scheduler may first assign packets up to rate_allowed; afterwards, if there is still RBs available, scheduler may keep assigning these extra packets, but they may be marked as tentative. Tentatively assigned RBs are treated as available by scheduler when assigning queues with lower scheduler priority. If the RBs are later assigned to queues with lower scheduler priority, these tentatively assigned packets may be returned to their source data queue.

In some embodiments, packets to be assigned may be run out before consuming all RBs. Scheduler may generate special packets for these extra RBs (such as training packets of various MCS rates, special keep-alive messages, etc.).

After assignment for data queues is finished, the leftover control packets that have not been merged with data traffic may be revisited and assigned to the remaining control symbols in the post-OFDMA section.

Figure 6C:
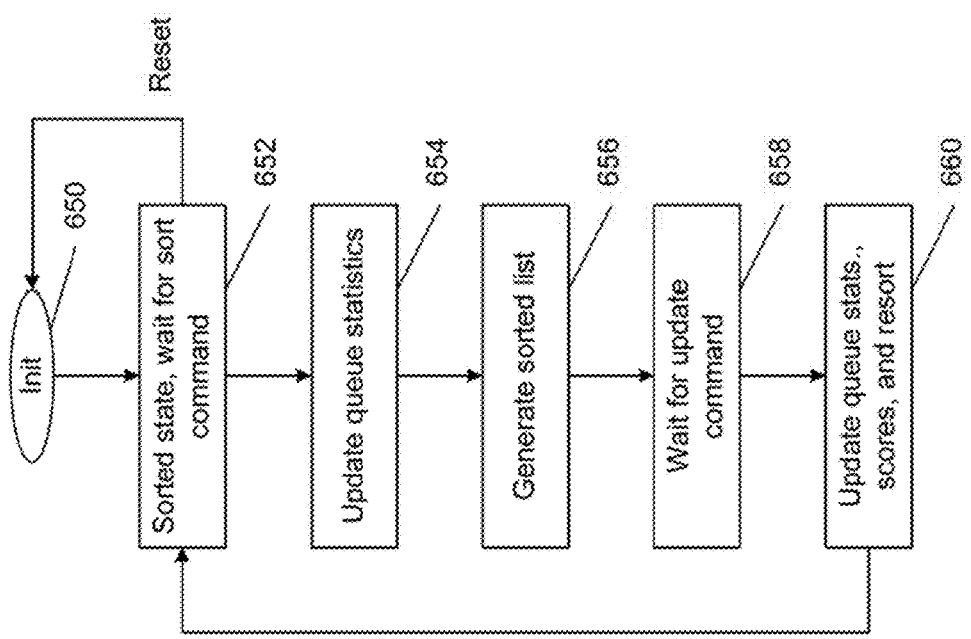
FIG. 6C illustrates an exemplary method of performing updating according to aspects of the present disclosure.

FIG. 6C illustrates an exemplary method of performing updating according to aspects of the present disclosure. As shown in FIG. 6C, the method of performing updating starts in block 650 where initialization is performed, and then moves to block 652. In the initialization phase, in the beginning, all queues are empty, so the initialization stage may include the following:

Clear all queue statistics and scores;
Construct the initial list in the order of queue IDs. As all scores are zero, the list is considered sorted.

In block 652, the queue is in sorted state, and the method waits for the sort command Upon receiving the sort command, the method moves to block 654; upon receiving a reset command, it returns to block 650. If the command from the scheduler is reset, then the method may go back to the initialization stage (block 650), and initialize the statistics, scores, and construct the sorted list as described above. If the command from the scheduler is Sort, then method moves to block 654.

In block 654, the method updates queue statistics, and then moves to block 656. In one exemplary implementation, upon receiving the Sort command, the method traverses the internal sorted list from head (highest score) to tail (lowest score), fetching the corresponding queue statistics at the same time. The statistics are kept locally inside the sorting module for subsequent references.

In block 656, the method generates a sorted list, and then moves to block 658. In one exemplary implementation, if the statistics indicates that the queue is nonempty and is not undergoing reset, the method puts the queue ID to the corresponding output sorted list, until either the end of the internal sorted list is reached, or when the output list includes sufficient items for the scheduler to process.

In block 658, the method waits for an update command; upon receive the update command, the method moves to block 660. In one exemplary implementation, the output sorted list may include candidates for the scheduler to consider. The method waits for the scheduler to finish its allocation step, until it receives the list of queue IDs that are actually scheduled in this subframe.

In block 660, the method updates queue statistics, scores, and resorts the queue. In one exemplary implementation, the queue statistics, such as rate_now, rate_max, wait_now, and wait_max fetched, has already been updated during the Sorting step. The internal sorted list may be traversed from head to tail again, and update the scores as follows:

If the queue has been scheduled, then the score is reset to 0, and the queue is moved to the tail of the sorted list;
If the queue has not been scheduled, then the score can be re-calculated using the statistics fetched earlier during the Sorting step. If the queue is empty, then the score is kept the same at zero; otherwise, the score is increased (never decreased), indicating an increase of the priority in the next round.

After the scores are updated, the list may no longer be sorted anymore, because not all queues receive the same amount of score increase. The list is re-sorted to bring the list back to the sorted state. From block 660, the method moves to block 652, and the process may be repeated. The following section describes the re-sorting step.

Note that in some implementations, the method of sorting and updating the queue may be implemented by a common hardware module, such as the sorter. The following diagram shows the operations of this module in both Sorting and Updating stages.

According to aspects of the present disclosure, two exemplary implementations for the sorted list, such as an array and a heap, are described. If an array is chosen, then insertion sort is used to bring the list back to the sorted state; if a heap is chosen, then heap sort is used instead. Heap sort has better worst-case performance (O(N log N)). Though insertion sort performs worse in typical cases ($O(N^2)$), it performs better when the list is substantially sorted. An exemplary implementation based on insertion sort is described below. The input to the sorter may include the following:

Assignment decision, which can be a list comprising the IDs of the queues that have been just scheduled.
The sorted list of queues based on their previously calculated scores (sort_list), implemented as an array; the array is ordered from high-score to low-score, and the value of each array entry is the queue ID.

Local copy of the status of each queue (stat_tab); the status may be fetched earlier during the Sort command phase.

Current level of each queue as calculated in the previous round (score_tab).

The queue update and sorting process can be summarized below.

The sorter fetches the IDs of the queues scheduled by the processor and saves the list locally. These queues are marked as "scheduled" in stat_tab.

The sorter goes through the sorted list to fetch the queue IDs. The following pseudo-code illustrates an exemplary implementation:

```
for (i=0, j=0; i<=queue_id_max; i++){
  qid=sort_list[i];
  status=stat_tab[qid];
  if (status.scheduled==TRUE){
    status_tab[qid].score=0;
      // these scheduled queues are not inserted back
        into sort_list
  }
  else if (status_tab[qid].has_data){
    update status_tab[qid].score;  // score can be
      increased, but not decreased
    // compact the sort_list by removing scheduled
      queues with level==0 sort_list[j]=qid; j++;
    // sort_list now that includes queues that are not
      scheduled
  }
}
```

Append the list of scheduled queue IDs (from the assignment step) back to the end of sort_list. After this step, sort_list may be substantially sorted, except that scheduled queues (with zero level value) may be in the end of the list.

Apply insertion sort or heap sort to sort_list to turn the list from substantially sorted (or almost sorted) to completely sorted.

FIG. 6D illustrates a method of modifying a sorted list according to aspects of the present disclosure. As shown in the example of FIG. 6D, numeral 662 shows the original sorted list with Queue ID and corresponding score before scheduling. Next, numeral 664 shows queues 1, 4, 9, 5, and 11 are scheduled and their corresponding scores are cleared to 0. Then, numeral 666 shows queues 6, 12, 2, 3, 8, 10, 7 are not scheduled and their corresponding scores are updated. Thereafter, numeral 668 shows scheduled queues with zero scores are moved to the end of the list, leaving the list "almost" sorted (also referred to as substantially sorted). Last but not least, numeral 670 shows that the list is re-sorted based on updated scores, where highlighted queues are reordered.

FIG. 7A illustrates a method of wireless communication according to aspects of the present disclosure. In the example shown in FIG. 7A, in block 702, the method obtains data to be transmitted over a plurality of sub-channels in a wireless communication environment. In block 704, the method determines channel conditions associated with the plurality of sub-channels. In block 706, the method schedules the data to be transmitted according to the channel conditions associated with the plurality of sub-channels to form scheduled data for transmission. In block 708, the method transmits the scheduled data to one or more receivers via the plurality of sub-channels.

FIG. 7B illustrates methods of determining channel conditions associated with a plurality of sub-channels according to aspects of the present disclosure. In some embodiments, the method performed in block 704 may comprise the methods performed in blocks 714 and/or 716.

In block 714, the method broadcasts training packets to a receiver via a sub-channel, obtains decoded training packets produced by the receiver, and assesses the interference observed at the sub-channel using the decoded training packets.

In block 716, the method broadcasts known data patterns to a receiver via a sub-channel, compares received data patterns to the known data patterns to determine signal to noise ratio associated with the sub-channel, and assesses the interference observed associated with the sub-channel using the signal to noise ratio associated with the sub-channel.

In another approach, the method of determining channel conditions associated with the plurality of sub-channels may comprise the methods performed in block 718. In block 718, the method determines channel conditions associated with the plurality of sub-channels based on a set of selection criteria, where the set of selection criteria includes transmission bandwidth, transmission latency, sampling rate, number of samples per OFDMA symbol, number of symbols per frame, data buffer usage, or some combination thereof.

FIG. 7C illustrates methods of scheduling data to be transmitted according to channel conditions associated with a plurality of sub-channels according to aspects of the present disclosure. In block 722, the method schedules the data to be transmitted into a number of sub-band symbols based on the number of sub-channels, where the data to be transmitted include multiple full-band OFDMA symbols and each sub-band symbol includes a portion from the multiple full-band OFDMA symbols. In some embodiments, the method performed in block 722 may include the methods performed in block 723 and block 724.

In block 723, the method sorts a list of queues carrying the data to be transmitted based on a score of each queue in the list of queues; allocates the data to be transmitted based on data type, size, location, and availability of resources blocks; assigns OFDMA packets according to the availability of the resources blocks; and updates the each queue in the list of queues with an updated score of the each queue and corresponding queue statistics.

In block 724, the method schedules based on a priority level of the data to be transmitted, a type of the data to be transmitted, a type of application of the data to be transmitted, a wait time requirement of the data to be transmitted, a budget requirement of the data to be transmitted, or some combination thereof.

FIG. 7D illustrates methods of transmitting scheduled data to one or more receivers via a plurality of sub-channels according to aspects of the present disclosure. In block 726, the method transmits the scheduled data to a receiver using a point-to-point transmission, transmits the scheduled data to multiple receivers using a point-to-multipoint transmission, or some combination thereof. In some embodiments, the method performed in block 726 may include the elements of blocks 728 and/or 730. In block 728, the plurality of sub-channels can be configured to support one or more types of data transmission quality of services. In block 730, the one or more of the plurality of sub-channels can be masked from carrying the scheduled data.

According to aspects of the present disclosure, in either AP and/or CPE, one exemplary implementation is to employ a two-chip solution that has the modem residing in one chip and the CPU residing in the other chip. The CPU and the modem chip are then connected via a high-speed link, such as PCIE. The chipset may forward data between the wired and wireless interfaces for handling ciphering, switching, and/or routing, if necessary.

In some implementations, there are two modes of data transmission between the wired and wireless interface: 1) the bridge mode, where data can be forwarded from one device to the other device with minimum software intervention; or 2) the router mode, where the networking software inspects, modifies, and/or drops the incoming data packets before data forwarding may occur. The networking functions supported in the router mode may include network address translation (NAT), traffic shaping, virtual local area network (VLAN), firewall, etc. Due to the complexity of the networking functions, they are typically implemented in software.

The Ethernet (wired) interface may reside in the same chip as the modem, or it may be on the CPU side. In one approach, the Ethernet interface resides on the CPU side, allowing the networking software to inspect and modify the data packets before transferring the packets over the PCIE link to the modem. As a result, the entirety of the radio traffic may flow through the PCIE link.

Figure 8:
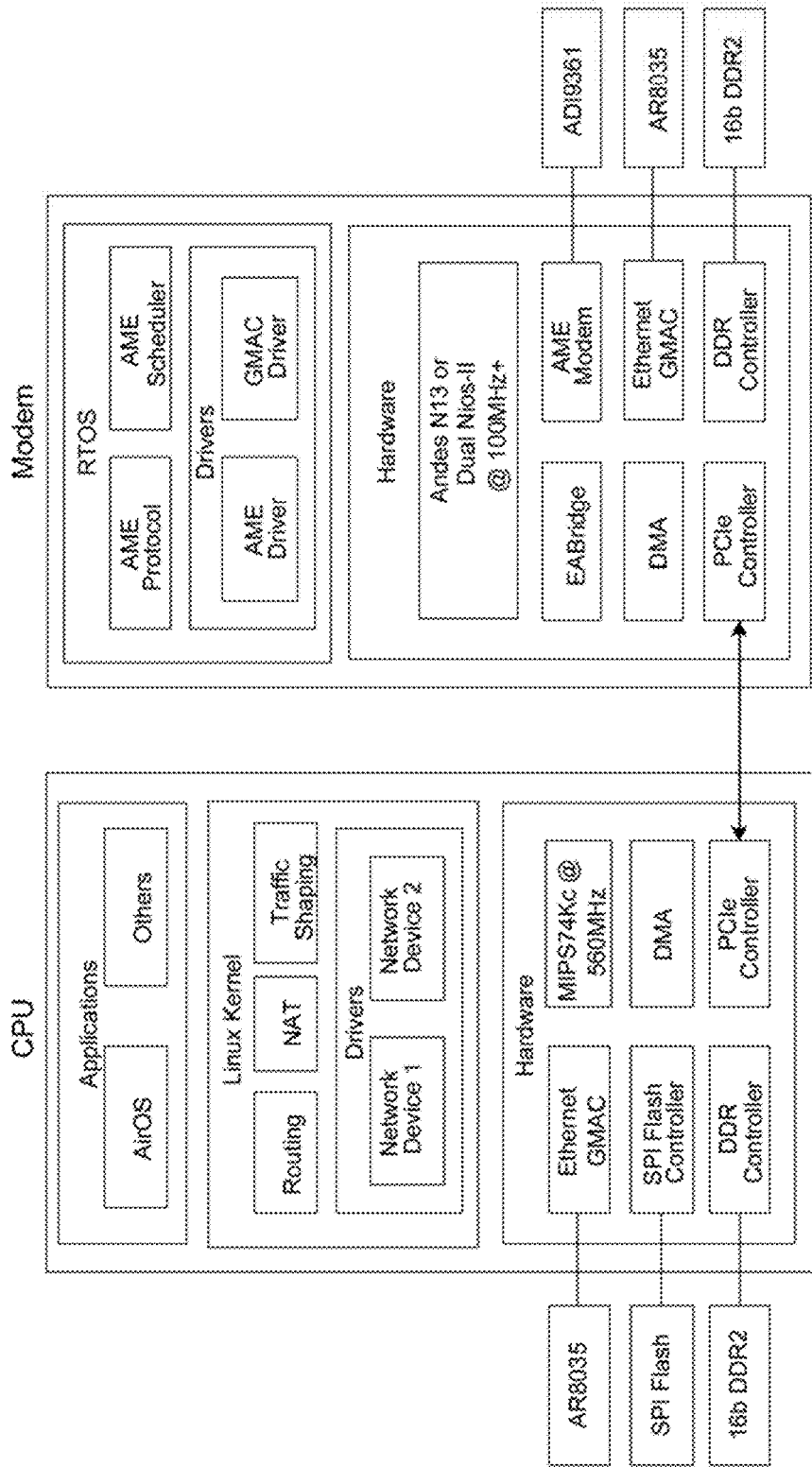
FIG. 8 illustrates an exemplary implementation of a wireless communication apparatus according to aspects of the present disclosure.

In another approach, the Ethernet interface may reside on the modem side. FIG. 8 illustrates an exemplary implementation of this two-chip architecture according to aspects of the present disclosure. In this approach, the Ethernet interface on the CPU side is configured to perform system configuration and management, but not to perform data transmission. Note that having the modem and the Ethernet interface on the same chip means that data would not have to travel off-chip in order to move between the wired and wireless interfaces. In addition, modifying the network headers means the associated checksum values may be updated as well. If a header is modified, a custom hardware can be invoked to update the checksum after direct memory access (DMA) is finished. To support the routing mode, DMA engines may be implemented to move the network header of a packet from the modem chip to the CPU. The CPU may perform the routing function by inspecting and modifying the header in the process, and then invoke the DMA to move the header from the CPU back to the modem chip. Note that typical sizes of these network headers are in the range of 60 to 80 bytes, whereas typical Ethernet packets are around 1.5K bytes in heavy traffic. As a result, this approach can effectively reduce the amount of traffic over the PCIE link, allowing the system to support higher data rates.

According to aspects of the present disclosure, a controller of the modem chip of FIG. 8 may be configured to set up a mechanism of repetitive data transfer of a plurality of data packets between a transmitter and a receiver, where the mechanism of the repetitive data transfer can be described in a header associated with the plurality of data packets. The modem controller further includes logic configured to retrieve the header from the transmitter, modify the header to generate an updated header, which may include descriptions of a source address, a destination address, a number of data packets to be transferred, and a mode of the repetitive data transfer, replace the header in the transmitter with the updated header, and instruct the transmitter to transmit the plurality of data packets to the receiver using the updated header. Note that in this particular implementation, the modem controller, the transmitter, and the receiver are different integrated circuit devices.

In some embodiments, the modem controller may comprise one or more central processing units and/or graphics processing units, a network interface controller, a memory controller, a direct memory access controller, and a device interface controller. The transmitter may comprises one or more central processing units, a network interface controller, a memory controller, a direct memory access controller, a device interface controller, and an EABridge (Ethernet-to-AME modem bridge) controller.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

We claim:

1. A method of wireless communication, comprising:
   obtaining, by one or more processors, data to be transmitted over a plurality of sub-channels in a wireless communication environment,
   determining, by the one or more processors, channel conditions associated with the plurality of sub-channels;
   scheduling, by a scheduler, the data to be transmitted according to the channel conditions associated with the plurality of sub-channels to form scheduled data for transmission, wherein the scheduled data is rotated with respect to the data to be transmitted to align with the plurality of sub-channels, comprising scheduling the data to be transmitted into a number of sub-band symbols based on the number of sub-channels, wherein the data to be transmitted include multiple full-band OFDMA symbols; and wherein each sub-band symbol includes a portion from the multiple full-band OFDMA symbols,
   wherein scheduling the data to be transmitted into a number of sub-band symbols comprises sorting a list of queues carrying the data to be transmitted based on a score of each queue in the list of queues, allocating the data to be transmitted based on data type, size, location, and availability of resources blocks, assigning OFDMA packets according to the availability of the resources blocks, and updating the each queue in the list of queues with an updated score of the each queue and corresponding queue statistics; and
   transmitting, by a modem, the scheduled data to one or more receivers via the plurality of sub-channels.

2. The method of claim 1, wherein determining channel conditions associated with the plurality of sub-channels comprises:
   broadcasting training packets to a receiver via a sub-channel
   obtaining decoded training packets produced by the receiver; and
   assessing interference observed at the sub-channel using the decoded training packets.

3. The method of claim 1, wherein determining channel conditions associated with the plurality of sub-channels further comprises:
   broadcasting known data patterns to a receiver via a sub-channel;
   comparing received data patterns to the known data patterns to determine signal to noise ratio associated with the sub-channel; and
   assessing interference observed associated with the sub-channel using the signal to noise ratio associated with the sub-channel.

4. The method of claim 1, wherein determining channel conditions associated with the plurality of sub-channels further comprises:
   determining channel conditions associated with the plurality of sub-channels based on a set of selection criteria; wherein the set of selection criteria includes transmission bandwidth, transmission latency, sampling rate, number of samples per OFDMA symbol, number of symbols per frame, data buffer usage, or some combination thereof.

5. The method of claim 1, wherein scheduling the data to be transmitted into a number of sub-band symbols based on at least one of:
   a priority level of the data to be transmitted;
   a type of the data to be transmitted;
   a type of application of the data to be transmitted;
   a wait time requirement of the data to be transmitted;
   a budget requirement of the data to be transmitted;
   or some combination thereof.

6. The method of claim 1, wherein transmitting the scheduled data to one or more receivers via the plurality of sub-channels comprises:
   transmitting the scheduled data to a receiver using a point-to-point transmission;
   transmitting the scheduled data to multiple receivers using a point-to-multipoint transmission;
   or some combination thereof.

7. The method of claim 6,
   wherein the plurality of sub-channels are configured to support one or more types of data transmission quality of services; and
   wherein one or more of the plurality of sub-channels are masked from carrying the scheduled data based on the one or more types of data transmission quality of services.

8. An apparatus for performing wireless communication, comprising:
   one or more processors configured to obtain data to be transmitted over a plurality of sub-channels in a wireless communication environment, and determine channel conditions associated with the plurality of sub-channels;
   a scheduler configured to schedule the data to be transmitted according to the channel conditions associated with the plurality of sub-channels to form scheduled data for transmission, wherein the one or more processor is further configured to rotate the scheduled data with respect to the data to be transmitted to align with the plurality of sub-channels, wherein the scheduler is further configured to schedule the data to be transmitted into a number of sub-band symbols based on the number of sub-channels, wherein the data to be transmitted include multiple full-band OFDMA symbols; and wherein each sub-band symbol includes a portion from the multiple full-band OFDMA symbols, wherein the scheduler is further configured to sort a list of queues carrying the data to be transmitted based on a score of each queue in the list of queues, allocate the data to be transmitted based on data type, size, location, and availability of resources blocks, assign OFDMA packets according to the availability of the resources blocks, and update the each queue in the list of queues with an updated score of the each queue and corresponding queue statistics; and a modem configured to transmit the scheduled data to one or more receivers via the plurality of sub-channels.

9. The apparatus of claim 8, wherein the one or more processors configured to determine channel conditions associated with the plurality of sub-channels are future configured to:
broadcast training packets to a receiver via a sub-channel;
obtain decoded training packets produced by the receiver: and
assess interference observed at the sub-channel using the decoded training packets.

10. The apparatus of claim 8, wherein the one or more processors configured to determine channel conditions associated with the plurality of sub-channels are further configured to:
broadcast known data patterns to a receiver via a sub-channel;
compare received data patterns to the known data patterns to determine signal to noise ratio associated with the sub-channel; and
assess interference observed associated with the sub-channel using the signal to noise ratio associated with the sub-channel.

11. The apparatus of claim 8, wherein the one or more processors configured to determine channel, conditions associated with the plurality of sub-channels are further configured to:
determine channel conditions associated with the plurality of sub-channels based on a set of selection criteria:
wherein the set of selection criteria includes transmission bandwidth, transmission latency, sampling rate, number of samples per OFDMA symbol, number of symbols per frame, data buffer usage, or some combination thereof.

12. The apparatus of claim 8, wherein the scheduler configured to schedule the data to be transmitted into a number of sub-band symbols is based on at least one of:
a priority level of the data to be transmitted;
a type of the data to be transmitted;
a type of application of the data to be transmitted;
a wait time requirement of the data to be transmitted;
a budget requirement of the data to be transmitted;
or some combination thereof.

13. The apparatus of claim 8, wherein modem configured to transmit the scheduled data to one or more receivers via the plurality of sub-channels is further configured to:
transmit the scheduled data to a receiver using a point-to-point transmission;
transmit the scheduled data to multiple receivers using a point-to-multipoint transmission;
or some combination thereof.

14. The apparatus of claim 13,
wherein the plurality of sub-channels are configured to support one or more types of data transmission quality of services; and
wherein one or more of the plurality of sub-channels are masked from carrying the scheduled data based on the one or more types of data transmission quality of services.

* * * * *